Sept. 14, 1926.  
L. R. RUTHENBURG  
1,599,840  
METHOD OF MAKING ROTORS  
Filed July 6, 1922 4 Sheets-Sheet 2

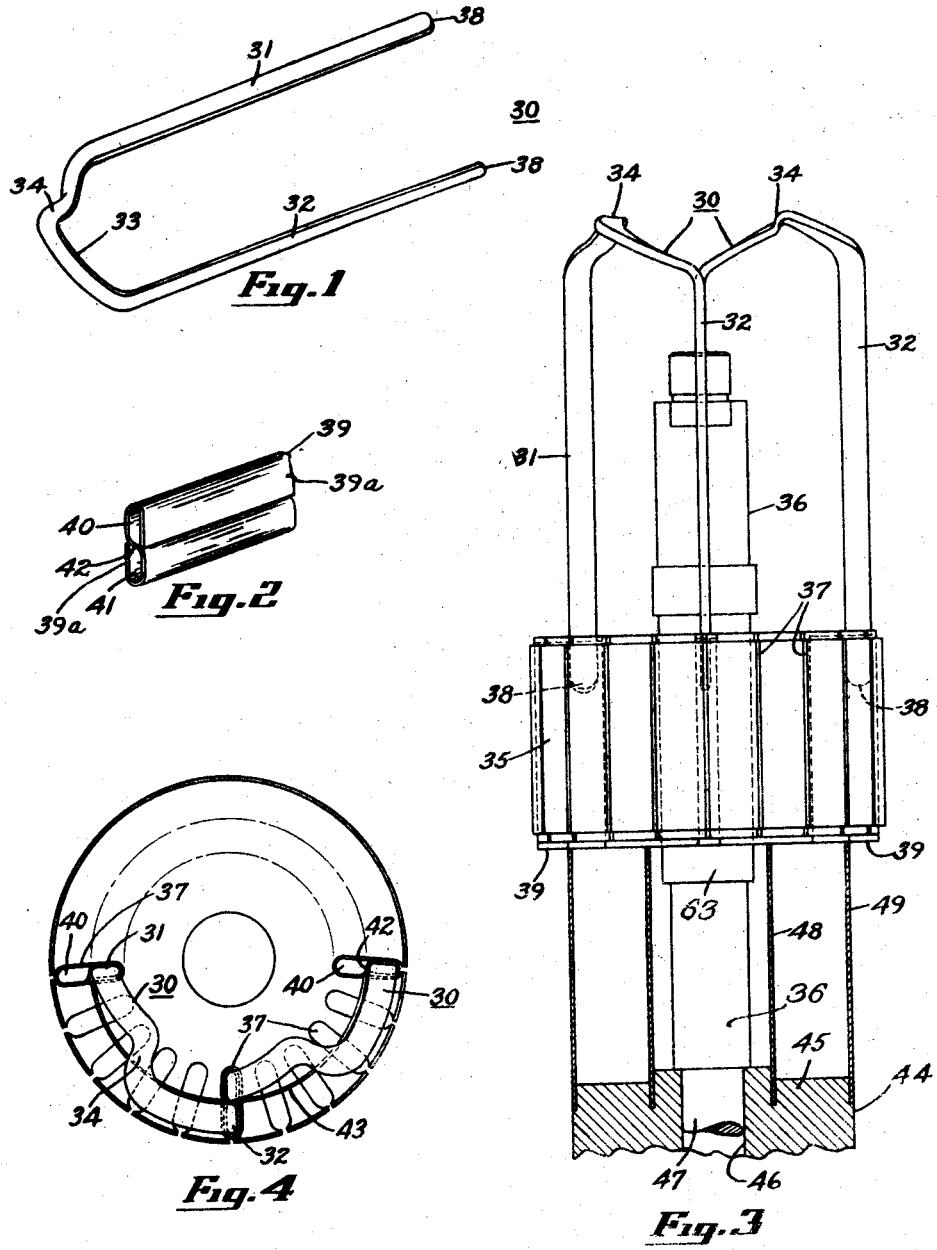

Witnesses  
Irvin A. Greenwald  
Lloyd M. Keighley

Inventor  
Louis R. Ruthenburg  
By Joe W. Morrison  
Attorney

Sept. 14, 1926. 1,599,840
L. R. RUTHENBURG
METHOD OF MAKING ROTORS
Filed July 6, 1922 4 Sheets-Sheet 3
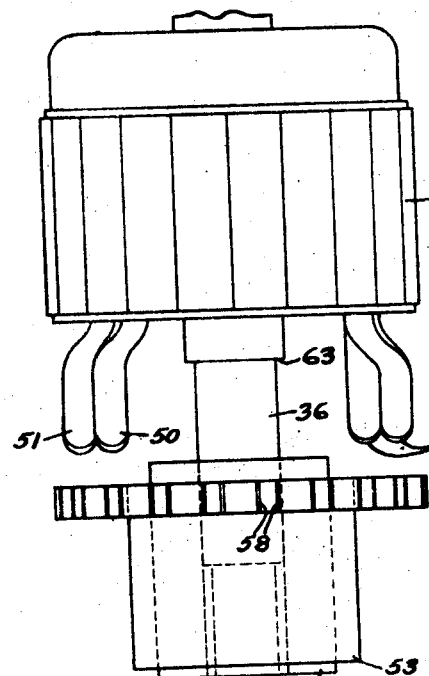
Fig. 10
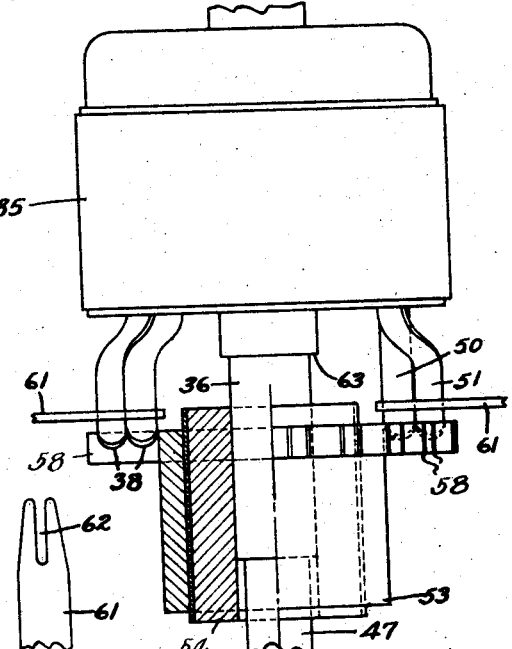
Fig. 12  Fig. 11
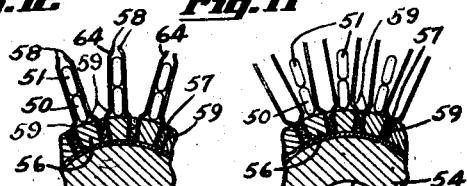
Fig. 15  Fig. 14
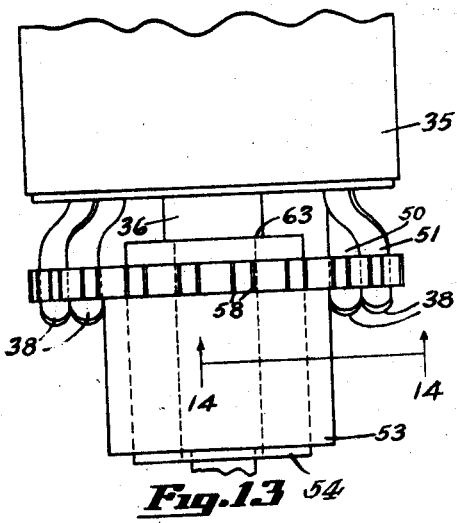
Fig. 13
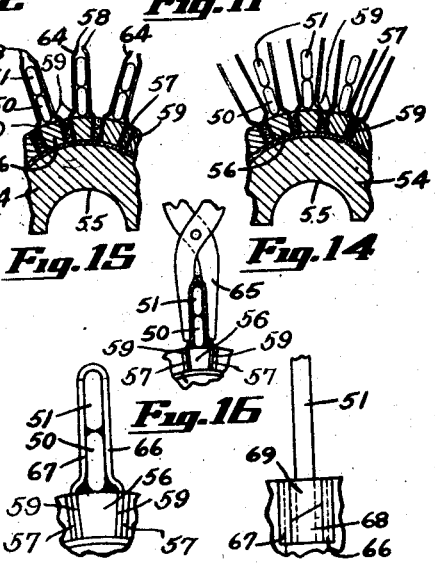
Fig. 16
Fig. 17  Fig. 18
Witnesses
Irvin A. Greenwald
Lloyd M. Keighley
Inventor
Louis R. Ruthenburg
By Joe W. Morrison
Attorney Sept. 14, 1926.  L. R. RUTHENBURG  1,599,840
METHOD OF MAKING ROTORS
Filed July 6, 1922  4 Sheets-Sheet 4
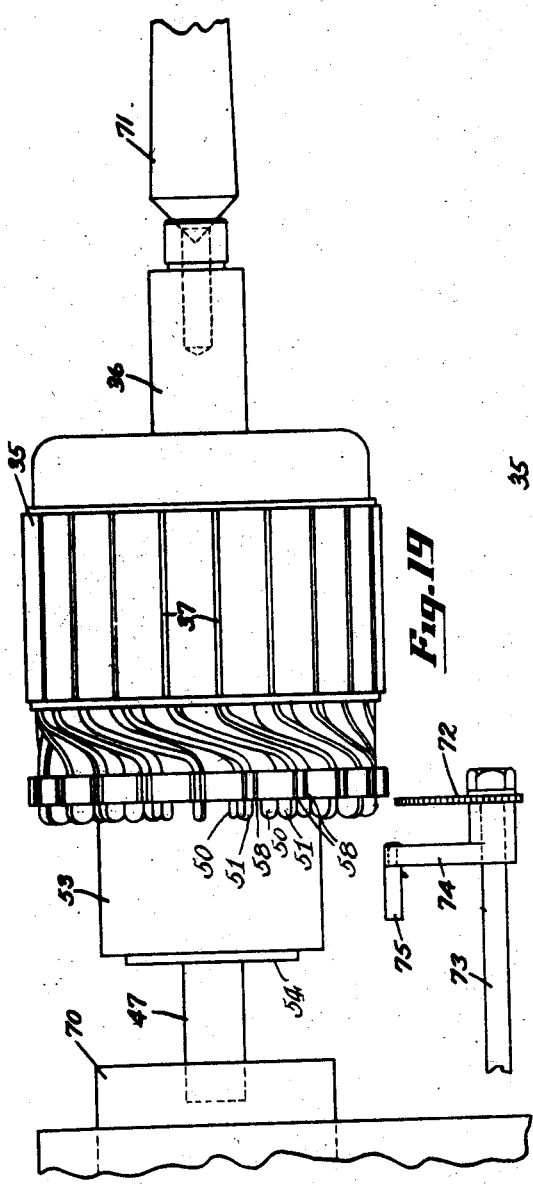
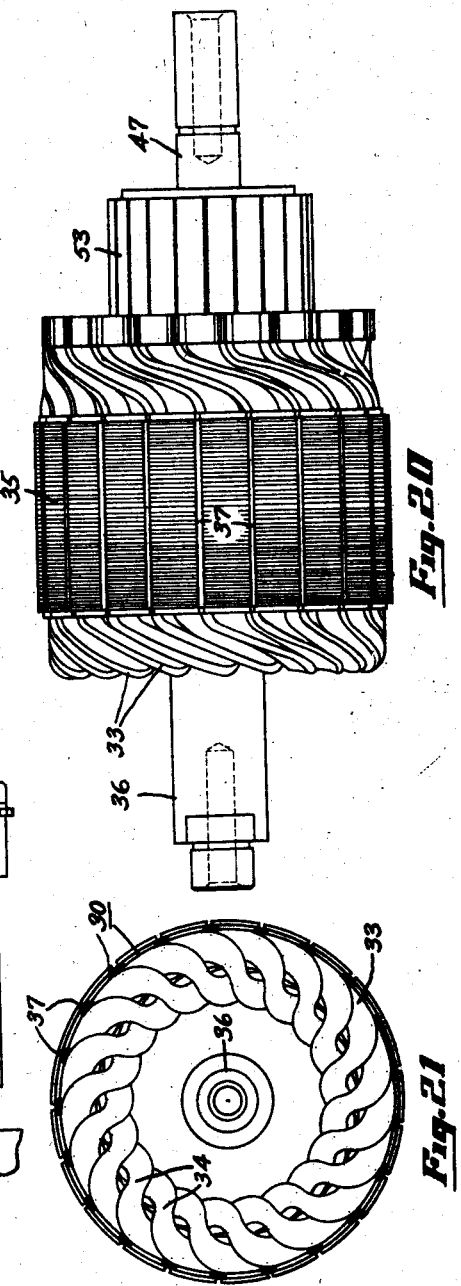
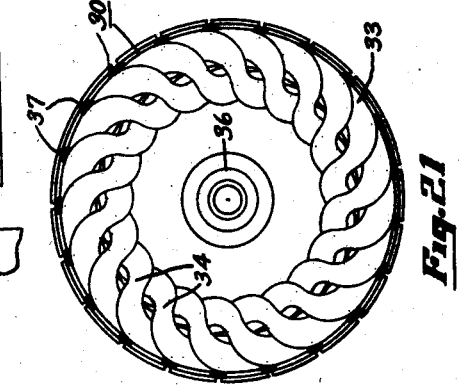

Patented Sept. 14, 1926.

1,599,840

UNITED STATES PATENT OFFICE.

LOUIS R. RUTHENBURG, OF DAYTON, OHIO, ASSIGNOR TO THE DAYTON ENGINEERING LABORATORIES COMPANY, OF DAYTON, OHIO, A CORPORATION OF OHIO.

METHOD OF MAKING ROTORS.

Application filed July 6, 1922. Serial No. 573,076.

This invention relates to rotors for dynamo electric machines and, more especially, to motor armatures having stiff bar windings whose ends form rigid leads connecting the windings to a commutator. In constructions and processes of manufacture used heretofore, the stiffness of the leads has necessitated manual operations in connecting the leads to a commutator, a wide separation of the leads to avoid contact between adjacent leads due to bending the latter out of shape during manual operations on the leads, and the use of a heavy commutator ring to connect the leads to the commutator segments.

The principal objects of the present invention are to employ a process of manufacture which may be carried out by machines, to reduce the size and cost of construction of bar wound armatures, and to promote the dependability of the armatures, particularly at high speeds.

In the accompanying drawings:

Fig. 1 is a perspective view of a hairpin bar winding employed in the production of armatures according to the present invention;

Fig. 2 is a perspective view of an insulating member forming a part of the armature;

Fig. 3 is a side elevation of a number of bar windings, an armature core and a plurality of insulators in assembling positions;

Fig. 4 is a top plan view thereof;

Fig. 10 illustrates a step in the process of assembling the commutator with the armature core carrying the windings;

Fig. 11 illustrates another step in the process of connecting the commutator with the armature core and its windings;

Fig. 12 is a plan view of a tool employed in the process of assembling the commutator and the bar windings;

Fig. 13 is a view similar to Fig. 11 but showing the commutator in its final position relative to the armature core;

Fig. 14 is a partial end view, taken on the line 14—14 of Fig. 13, of the commutator and bar windings;

Fig. 15 shows the relative positions of the commutators, risers, and winding leads after the risers have been bent over the leads;

Fig. 16 illustrates the manner of finally securing the risers to the leads;

Fig. 17 is a side view of a modified form of riser;

Fig. 18 is a plan view thereof;

Fig. 19 illustrates a manner of removing the projecting free ends of the winding leads;

Fig. 20 is a side view of a completed armature; and

Fig. 21 is an end view thereof.

Figure 5:
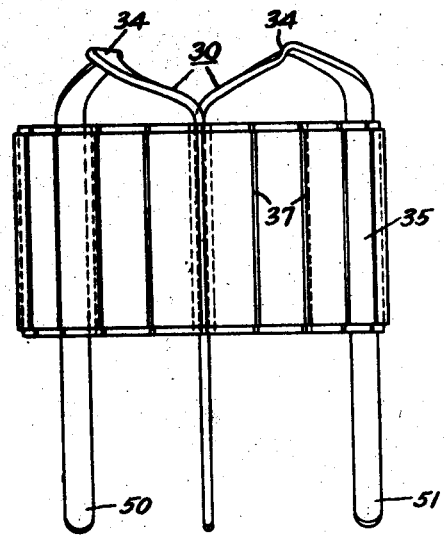
Fig. 5 is a side view of the armature parts shown in Fig. 3 in their assembled positions.

The hairpin bar winding 30 illustrated in Figs. 1, 3, and 4 has parallel arms 31, 32 joined at one end by a transverse yoke 33 having an offset portion 34 spacing the arms 31, 32 and holding the latter in different radial planes so that a plurality of windings may be assembled in an armature core 35 mounted on an armature shaft 36, with one arm 31 seated in the inner portion of an armature slot 37 and the other arm 32 in the outer portion of another slot 37. The free ends 38 of the arms are rounded and tapered. This form of hairpin bar winding is preferred because the portion 34 is offset transversely of the armature and projects a minimum distance from the adjacent ends of the parallel arms 31, 32, but the present invention is not limited to any specific form of bar winding.

39 is an 8-shaped insulating tube having two longitudinal passages 40, 41 separated by a transverse web 42, the walls of the passages being formed by the sides of the insulating tube.

When assembling these members by hand, the armature core is laid on its side, the free ends or leads are inserted in the slots 37 of the armature core 35 forming a nest of windings projecting from this end of the armature core, and the insulating tubes 39 are inserted into the slots 37, from the opposite end of the armature core. If desired a strip of insulating material 43 (Fig. 4) may be inserted between the arms 31, 32 of the nested windings. The material forming the insulating tubes is usually relatively stiff and the free edge portions 39a of each tube tend to move outwardly away from the dividing wall 42 between the channels 40, 41 and press against the walls of the slots. When the insulating tubes and windings are pushed further into the slots, the leading ends of the tubes pass over the rounded ends 38 of the bar windings. The assembling of the bar windings in the slots before the insulating tubes are in final position affords a relatively large opening into which the bar ends are inserted and promotes rapid assembly of the windings. The slot walls hold the bar windings and insulating tubes in alignment and guide the windings into the channels on the tubes.

44 is an assembling or holding tool having a base 45 apertured at 46 to receive the reduced end portion 47 of the armature shaft 36. Projecting from one side of this base 45 are two concentric cylinders 48, 49. The inner cylinder 48 supports the armature core at a point within the annular series of slots 37 and the outer cylinder 49 contacts with the armature core in a circle in alignment with the annular series of transverse webs 42 of the insulating tubes. This holding tool is placed on the reduced end portion 47 of the armature shaft 36 and the partially assembled windings, armature and tool are moved into a vertical position as shown in Fig. 3. The hairpin bar windings are then pressed downwardly into the position shown in Fig. 5, the bar windings sliding through the channels 40 and 41 of the insulating tubes which are held in position in the armature slots during this assembling operation by the cylinder 49 of the holding tool.

Figure 6:
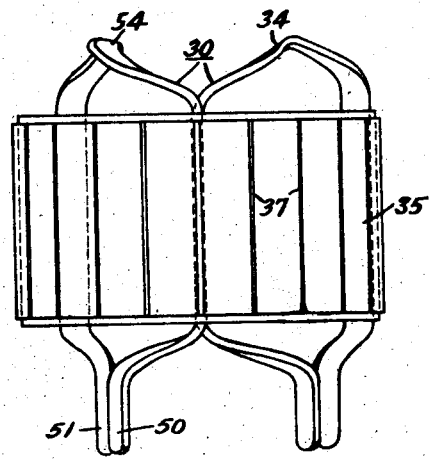
Fig. 6 is a side view of a partially completed armature with the bar winding leads grouped in pairs.
Figure 7:
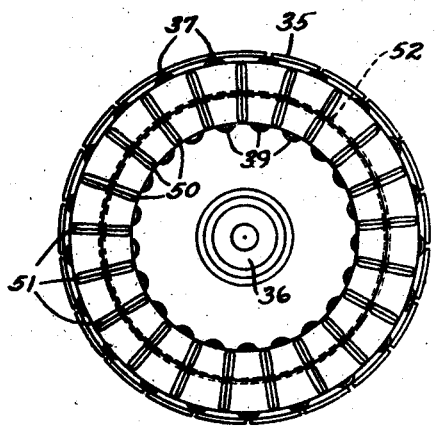
Fig. 7 is an end view of the armature shown in Fig. 6 with all the windings assembled in the armature core.
Figure 8:
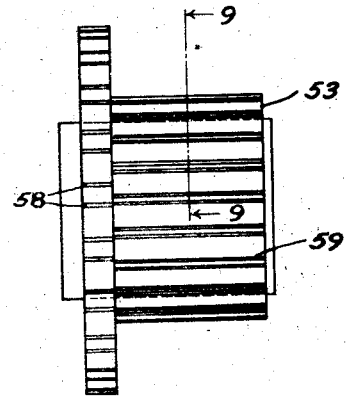
Fig. 8 is a side view of a commutator forming a part of an armature embodying the present invention.
Figure 9:
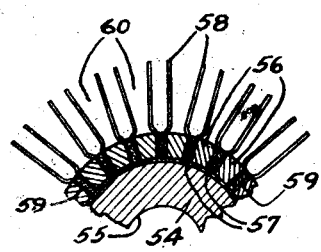
Fig. 9 is a partial sectional view thereof taken substantially on the line 9—9 of Fig. 8.

The free ends or leads 50 of the inner annular series of windings and the leads 51 of the outer annular series of windings are then bent circumferentially and inwardly into juxtaposed radial position with the leads in contact edgewise as shown in Figs. 6 and 7, this bending preferably being performed simultaneously on all of the leads of both series by a bending apparatus such as is shown in the copending application of Robert H. Ahlers and Earl M. Polk Patent No. 1,556,891 issued October 13, 1925. An insulating strip 52 similar to the strip 43 is placed between these two series of leads as shown in Fig. 7. During this bending operation, the leads 50 and 51 are pressed into substantially final position with each pair of leads 50 and 51 in contact and positioned longitudinally of the armature, the stiffness of the leads maintaining their relative positions during subsequent operations. The annulus of the leads has a normal internal diameter approximately equal to the outside diameter of the commutator. The leads may be pressed inwardly so that the inner surfaces of the leads 50 form a broken annular surface smaller in diameter than the outer surface of the commutator on which they are to be finally located.

The commutator 53 has a hub 54 apertured at 55 to receive the shaft 36 of the armature core, on which shaft the hub 54 is press fitted. Mounted on the hub 54 is an annular series of commutator segment blocks 56 spaced by insulating strips 57. The commutator segments have risers 58 which are preferably formed of L-shaped copper strips secured in pairs about each segment. Each complete segment comprises a segment block 56 and a pair of L-shaped copper strips whose longer legs 59 are held securely against the sides of the segment block 56, forming a continuous segment extending over two legs 59 and the intervening block with two flexible arms or risers 58 forming the shorter legs of the L-shaped strips, projecting radially from the segment.

Referring to Figs. 10, 11, 12, and 13, the commutator is slipped over the end 47 of shaft 36 and adjusted angularly to bring the slot 60 between each pair of risers 58 of a commutator segment in alignment with a radially juxtaposed pair of leads 50, 51. A tool 61 having a narrow slot 62 at one end adapted to receive a pair of leads 50, 51, is moved radially inward over each pair of leads to hold the latter in properly spaced radial positions. If desired, radial pressure may be applied to the tools 61 to bend the pairs of leads 50, 51 inwardly and preset them with the inner edges of the leads 50 within a radius of the commutator instead of presetting them during the bending of the leads to juxtaposed positions. The commutator is then pressed axially toward the armature core until the leads enter the slots 60 (see Fig. 11), the tools 61 are withdrawn, and the commutator is pressed into final position on the armature shaft 36 against the shoulder 63 formed thereon, in which position the rounded ends of the leads project through the slots 60 (Fig. 13).

During the pressing of the commutator on the armature shaft, the rounded ends of the inner leads 50 ride over the leading end of the commutator forcing the two series of leads outwardly, the spring in the copper arms forming the windings and leads causing the inner series of leads 50 to press tightly against and form a good electrical contact with the commutator segment blocks 56, and the outer series of leads 51 to press against the inner series of leads 50.

Each pair of risers 58 is then pressed against the sides of a pair of juxtaposed leads 50, 51 and over the outer edge of a lead 51 to form shoulders 64 clamped against the outer leads (Fig. 15). The commutator is then dipped in molten solder to a point above the inner surface of the annular series of risers 58 and before the solder has set upon the commutator, a tool 65 is clamped onto each pair of risers, pressing the latter firmly against the leads 50, 51, and the solder is permitted to cool while the parts are so clamped. This squeezes out excess solder and presses the risers into final position about the leads, the solder preventing the risers springing away from the leads when the clamping tool 65 is removed. This method produces good electrical contact between the risers and leads by forming the risers closely about the leads, binding the leads tightly against the segment blocks 56, and reducing to a minimum the solder between the leads and risers, which solder usually has a much higher resistance to flow of an electrical current than the copper employed in the commutator and windings.

In Figs. 17, 18 is shown a modified form of commutator in which risers 66, 67 projecting outwardly from a segment block 56 have reversed complementarily biased ends 68, 69 clamped over the outer edge of a lead 51.

These riders may be preformed with their ends overlapping and their inner surfaces closer together than the thickness of a bar winding or lead so that the forcing of the tapered ends of the leads between the risers causes the risers to fit closely about the leads. This preforming of the leads substantially to final shape may be effected with either kind of riser when the latter are cut and save an operation in initially shaping the risers about the leads. If the slots 60 between the risers are relatively wide the aligning tool 61 need not be used, however the use of a tool for this purpose assists in rapid assembly with risers spaced far apart and with risers preformed to substantially final shape.

The armature is then placed in a lathe having head stock 70 and tail stock 71 and rotated. A saw 72 driven by a shaft 73 supported by arm 74 movable about an axis 75 is moved inwardly toward the axis of the armature to cut off the ends of the leads 50 and 51, which project through the risers 58. Solder deposited on the commutator segments during the dipping operation is then removed from the commutator and the armature is completed.

The annular series of yokes 33 joining the bar windings 31, 32 projects a very small distance from the left-hand end of the armature as viewed in Fig. 20, and the leads 50 and 51 of the windings are pressed closely together at the opposite end of the armature core forming a structure having a relatively short length from the closed end of the hairpin windings to the commutator as contrasted with constructions employed heretofore. Figs. 20 and 21 are drawings to actual size of an armature employed in starting motors for internal-combustion engines. It has been found that in armatures of this size and constructed in accordance with the present invention, a saving of about 14 inches of copper in the bar windings is effected over prior constructions employed with armatures of the same size.

The assembling of an armature by moving the commutator axially into position, assists in the saving of material by permitting a closer grouping or pressing together of the leads as shown at the right-hand end of the armature in Fig. 20 than is possible where the leads are manipulated by hand to place them in slots cut in segment blocks. By clamping and forming the flexible risers around the leads while the solder is plastic, substantially all of the excess solder will be forced out so that the electrical resistance between the leads and the risers will be reduced to the minimum. The use of relatively light weight risers permit a substantial reduction in centrifugal force affecting the commutator. It has been found in practice that by employing flexible risers to connect the commutator segments to the stiff leads, moving the commutator axially into position between the assembled leads, and attaching these risers to the leads by machine operation as contrasted to the hand operations necessary in prior constructions, a marked saving in cost is obtained, and the armature will withstand hard usage, and centrifugal force at high speeds better than prior forms in which the bar leads are wedged or riveted into slots cut in a projecting commutator ring.

Armatures made according to the method above described may be rotated at 20,000 R. P. M. without damage to the windings or commutator, and starting motors employing this construction may be operated without using an overrunning clutch to prevent high armature speeds when the internal-combustion engine, started by the motor, becomes self-operative.

What I claim is as follows:

1. The method of assembling a commutator upon an armature having stiff winding leads, comprising, bending the leads substantially to their final position but to a slightly closer position to the armature axis than their final position, moving the commutator axially toward said leads to cause the ends of said leads to enter and ride upon the bottom of slots in said commutator and thereby spring said leads radially outward to their final position, and then permanently securing said leads to said commutator.

2. The method of assembling a commutator upon an armature having projecting stiff winding leads, comprising, arranging the leads in their final position except that the annulus formed by the ends of said leads is of slightly smaller diameter than the final form thereof, then moving the commutator to position to engage said leads and spring them radially outward to final position.

3. The method of assembling a commutator upon an armature having two series of projecting stiff winding leads, comprising, bending said leads into two annular series with inner and outer leads arranged in pairs and bent slightly closer to the armature axis than their final position, then moving said leads axially into slots on the commutator whereby said leads are sprung radially outward to their final position and pressed tightly against the bottom of said slot and against each other by the spring action of the stiff leads.

4. The method of assembling a commutator upon an armature having two series of projecting stiff winding leads, comprising, bending said leads into two annular series with inner and outer leads arranged in pairs and bent slightly closer to the armature axis than their final position, then moving said leads axially into slots on the commutator whereby said leads are sprung radially outward to their final position and pressed tightly against the bottom of said slot and against each other by the spring action of the stiff leads, and then rigidly securing said leads to said commutator.

In testimony whereof I hereto affix my signature.

LOUIS R. RUTHENBURG.